(No Model.)
W. H. WILDER.
VAPOR BURNER.
No. 465,227. Patented Dec. 15, 1891.
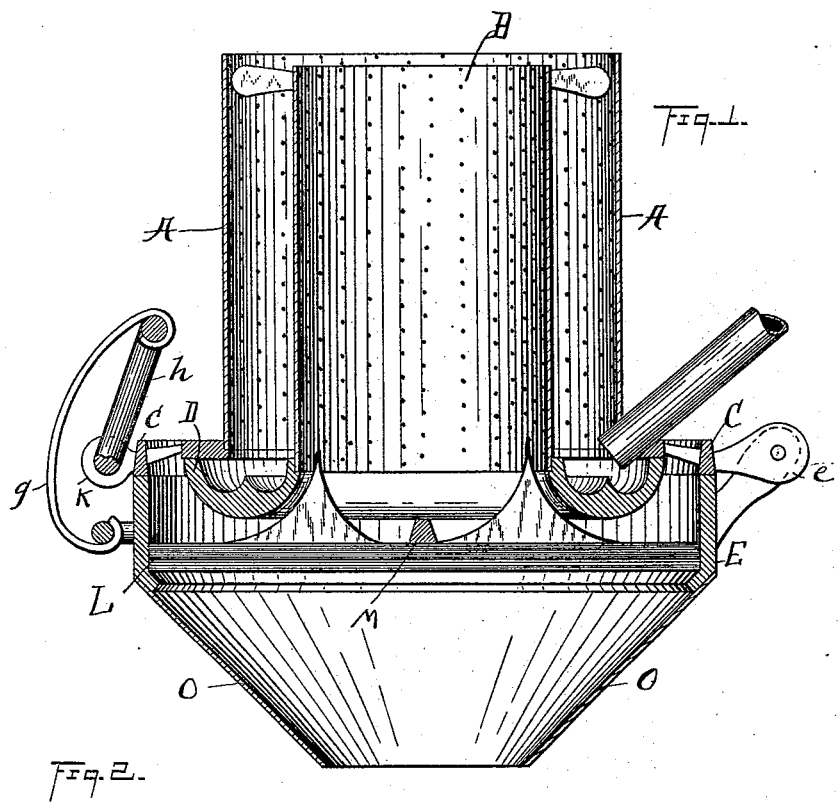
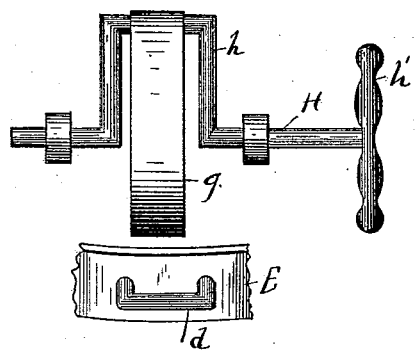
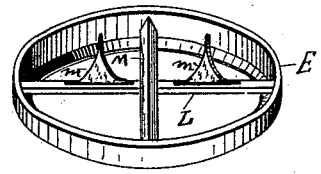
WITNESSES
Belle S. Lowrie
Victor Schneider
Wm. H. Wilder
INVENTOR
by H. T. Fisher.
ATTORNEY

UNITED STATES PATENT OFFICE.

WILLIAM H. WILDER, OF FLORENCE, MASSACHUSETTS.

VAPOR-BURNER.

SPECIFICATION forming part of Letters Patent No. 465,227, dated December 15, 1891.

Application filed March 2, 1891. Serial No. 383,407. (No model.)

*To all whom it may concern:*

Be it known that I, WILLIAM H. WILDER, a citizen of the United States, residing at Florence, in the county of Hampshire and State of Massachusetts, have invented certain new and useful Improvements in Vapor-Burners; and I do hereby declare that the following is a full, clear, and exact description of the invention, which will enable others skilled in the art to which it appertains to make and use the same.

The invention relates to improvements in vapor-burners, and more particularly to the construction and mode of operation of the burner mechanism described and claimed in the application of John A. Lannert and William R. Jeavons, Serial No. 370,552, in which the subject-matter of the invention in its broader sense is shown and claimed.

In the accompanying drawings, Figure 1 is vertical central section of a burner embodying this invention, and Fig. 2 is a side elevation of the locking parts. Fig. 3 is a perspective of the lower pivoted frame.

The invention in this application resides more especially in the mechanism for holding the lower section of the frame in raised position, and no claim to novelty is made in the other parts in themselves—that is, the burner-tubes A and B, the top frame C, the bowl D, as shown, and the lower frame E are not claimed as novel in this case. The frame E is pivoted at one side at e to ears or the like on the upper fixed frame C, and has a loop, ring, or its equivalent d at the side opposite the pivot-point e, adapted to be engaged by a preferably hook-shaped catch g, pivotally secured to the crank h of the crank rod or shaft H, pivoted in bearings k on the upper frame C. The rod or shaft H has a handle h', preferably integral therewith, though it may be separate, by which the crank is turned in its bearings, and the crank is held in raised position, as seen in Fig. 1, by being turned slightly past the vertical plane of its axis, where it meets any suitable stop on the bearing-frame. When the lower frame E, which supports the vaporizing-bowl, is to be lowered, the said crank is turned so as to drop down in a reverse position from that here shown, the hook g meantime supporting the said frame, as it does in all positions to which the frame E is moved. The part g is preferably in the shape of a hook, so as to be readily detachable from frame E; but any other suitable connection may be made at this point.

The vaporizing-bowl is supported on the lower frame E, preferably through cross-bars L and M, at right angles to each other, and the latter raised above the bar L, so as to become the immediate support. This latter bar may be balanced on the bar L, if preferred, but is shown here as rigid thereon, and suitable standards m serve to center and guide the bowl in the said frame.

O represents a hood with sides converging downwardly from the frame E and a central opening below for the admission of air to the burner. This hood operates as a shield against intrusive air-currents, which might disturb the operations of the burner, and also reflects back the heat radiated from the burner-bowl in a downward direction.

The hook-support g preferably is made with a slight spring, so as that it will be somewhat yielding when the crank is turned over the center and will be strong enough to hold the bowl firmly in position against the frame C when the parts are locked, as shown.

Having thus described my invention, what I claim as new, and desire to secure by Letters Patent, is—

1. The fixed upper frame of the burner, the pivoted lower frame, and a catch to lock the lower frame in raised position, substantially as described.

2. The pivoted lower frame, the bowl supported thereon, and a locking device for supporting the said lower frame either up or down, substantially as described.

3. The pivoted lower frame, the bowl resting thereon, and a crank-shaped locking device, and a catch to hold the said frame up, substantially as described.

4. The fixed upper frame, the pivoted lower frame, a crank-shaft, and a link connecting the crank with the lower frame, substantially as described.

Witness my hand to the foregoing specification this 13th day of February, 1891.

WILLIAM H. WILDER.

Witnesses:
H. K. PARSONS,
W. J. ANGELL.